(12) United States Patent
Klingler et al.

(10) Patent No.: US 7,670,215 B2
(45) Date of Patent: Mar. 2, 2010

(54) CONTROL DEVICE COMPRISING A ROLLER BAND CASSETTE

(75) Inventors: Dietrich Klingler, Heubach (DE); Werner Schwahn, Schwieberdingen (DE)

(73) Assignee: BEHR GmbH & Co. KG, Stuttgart (DE)

( * ) Notice: Subject to any disclaimer, the term of this patent is extended or adjusted under 35 U.S.C. 154(b) by 1132 days.

(21) Appl. No.: 10/524,739

(22) PCT Filed: Aug. 12, 2003

(86) PCT No.: PCT/EP03/08915

§ 371 (c)(1),
(2), (4) Date: Apr. 15, 2005

(87) PCT Pub. No.: WO2004/018244

PCT Pub. Date: Mar. 4, 2004

(65) Prior Publication Data

US 2005/0233686 A1    Oct. 20, 2005

(30) Foreign Application Priority Data

Aug. 16, 2002 (DE) .............................. 102 38 430

(51) Int. Cl.
*B60H 1/00* (2006.01)
*F24F 13/10* (2006.01)
*F24F 7/007* (2006.01)

(52) U.S. Cl. .................. 454/121; 454/69; 454/156; 165/42; 251/901

(58) Field of Classification Search .......... 454/121, 454/126, 160, 161, 69, 156; 165/41, 42; 251/901

See application file for complete search history.

(56) References Cited

U.S. PATENT DOCUMENTS

| 3,282,613 | A | * | 11/1966 | Axelsonn ................. 52/396.06 |
| 4,095,113 | A | * | 6/1978 | Wolff ...................... 250/494.1 |
| 5,105,730 | A | * | 4/1992 | Smith ........................ 454/161 |
| 5,145,456 | A | | 9/1992 | Ito et al. |
| 5,160,115 | A | * | 11/1992 | Ito et al. ................. 251/129.12 |
| 5,243,830 | A | | 9/1993 | Ito et al. |
| 5,326,315 | A | * | 7/1994 | Inoue et al. ................. 454/126 |
| 5,632,672 | A | | 5/1997 | Higashihara |
| 5,653,630 | A | * | 8/1997 | Higashihara ................. 454/121 |
| 5,878,806 | A | | 3/1999 | Denk et al. |

(Continued)

FOREIGN PATENT DOCUMENTS

DE          23 43 074 A1     3/1975

(Continued)

*Primary Examiner*—Steven B McAllister
*Assistant Examiner*—Patrick F. O'Reilly, III
(74) *Attorney, Agent, or Firm*—Foley & Lardner LLP

(57) ABSTRACT

The invention relates to a control device (1) for controlling airflows in motor vehicles, comprised of a frame having at least one passage opening (4) and at least one controlling means, which is provided in the form of a roller louver (5) and which serves to modify the passage cross-section for the air flowing through the passage opening (4). The frame comprises a housing (2) with at least two hollow bodies (8) that are open along the longitudinal sides. These hollow bodies (8) accommodate the drive shaft (6) or the return shaft (7) for the roller louver (5), and each have a pivotal cover (8.3) for opening the respective hollow body (8). The control device (1) can be mounted inside airflow ducts of a heating and/or air-conditioning system for motor vehicles.

31 Claims, 15 Drawing Sheets

U.S. PATENT DOCUMENTS

| | | | |
|---|---|---|---|
| 5,901,943 A | 5/1999 | Tsunoda | |
| 5,906,355 A * | 5/1999 | Danieau | 251/326 |
| 5,916,021 A * | 6/1999 | Danieau | 454/69 |
| 5,931,733 A * | 8/1999 | Danieau | 454/69 |
| 5,954,578 A * | 9/1999 | Takasaki | 454/121 |
| 5,984,772 A * | 11/1999 | Danieau | 454/69 |
| 6,023,899 A * | 2/2000 | Mecozzi | 52/396.04 |
| 6,074,294 A | 6/2000 | Stevenson | |
| 6,296,562 B1 * | 10/2001 | Uemura et al. | 454/121 |
| 6,325,096 B1 | 12/2001 | Rising et al. | |
| 6,695,691 B1 * | 2/2004 | Le | 454/156 |
| 6,802,768 B2 * | 10/2004 | Stevenson et al. | 454/69 |
| 6,979,258 B2 | 12/2005 | Goupil, Jr. et al. | |
| 7,246,788 B2 * | 7/2007 | Klingler et al. | 251/212 |
| 2005/0217738 A1 | 10/2005 | Klingler et al. | |

FOREIGN PATENT DOCUMENTS

| | | |
|---|---|---|
| DE | 35 14 358 A1 | 10/1986 |
| DE | 44 42 000 A1 | 5/1996 |
| DE | 197 11 209 A1 | 10/1997 |
| DE | 198 01 979 A1 | 7/1998 |
| EP | 0 545 320 B1 | 1/1997 |
| EP | 0 705 725 B1 | 3/1999 |
| JP | 61-79968 A | 4/1986 |
| JP | 64-85809 A | 3/1989 |
| JP | 7-001945 A | 1/1995 |
| JP | 10230732 A * | 9/1998 |

* cited by examiner

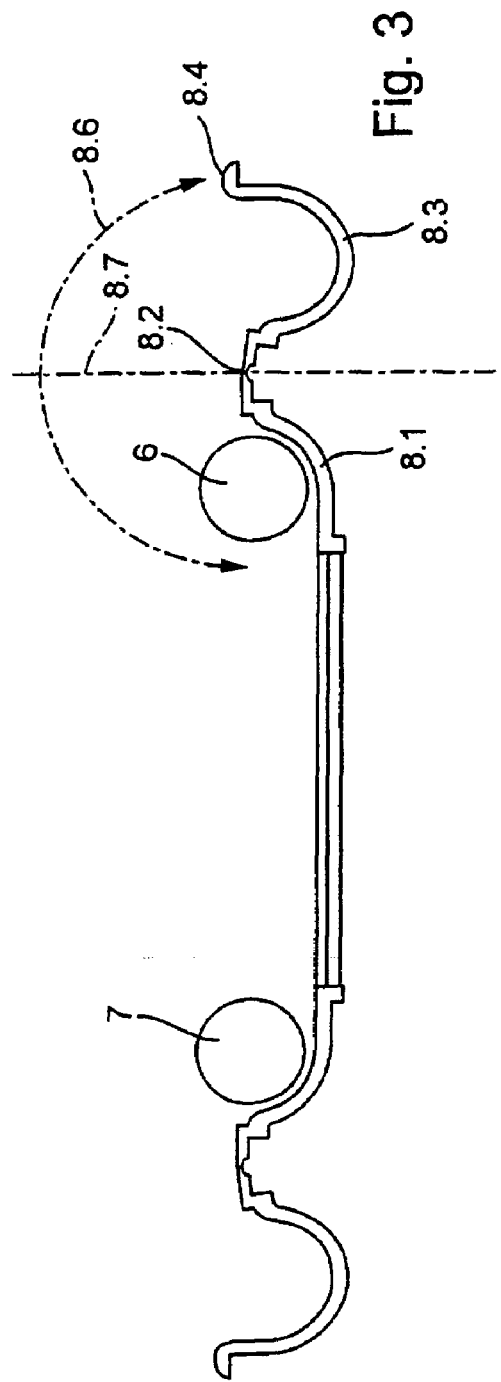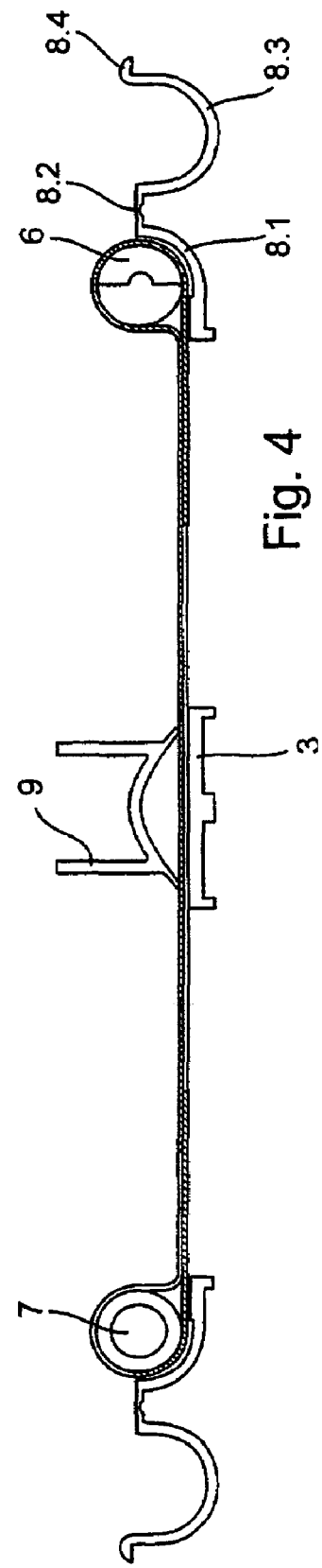

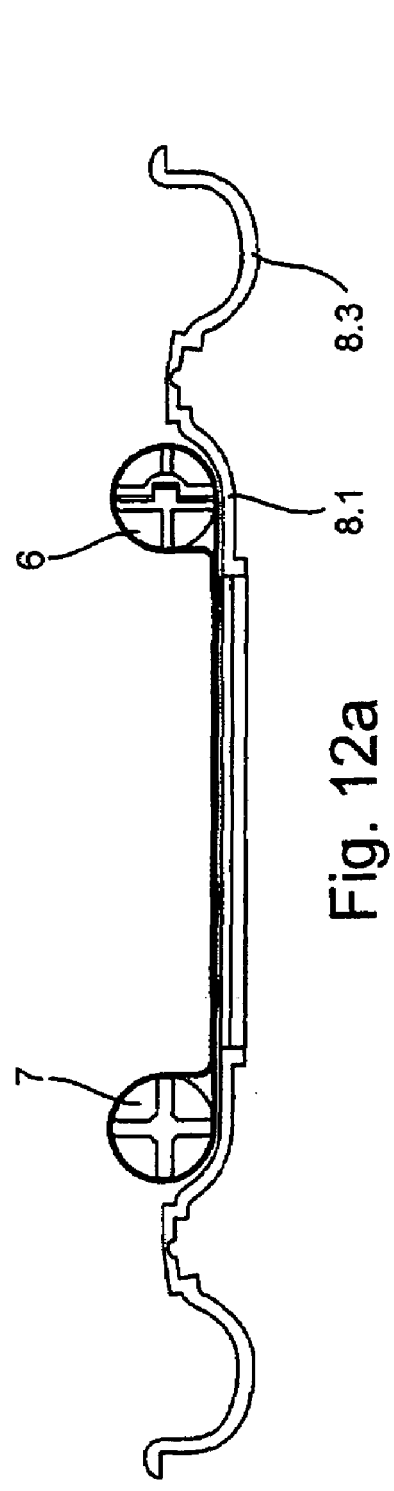
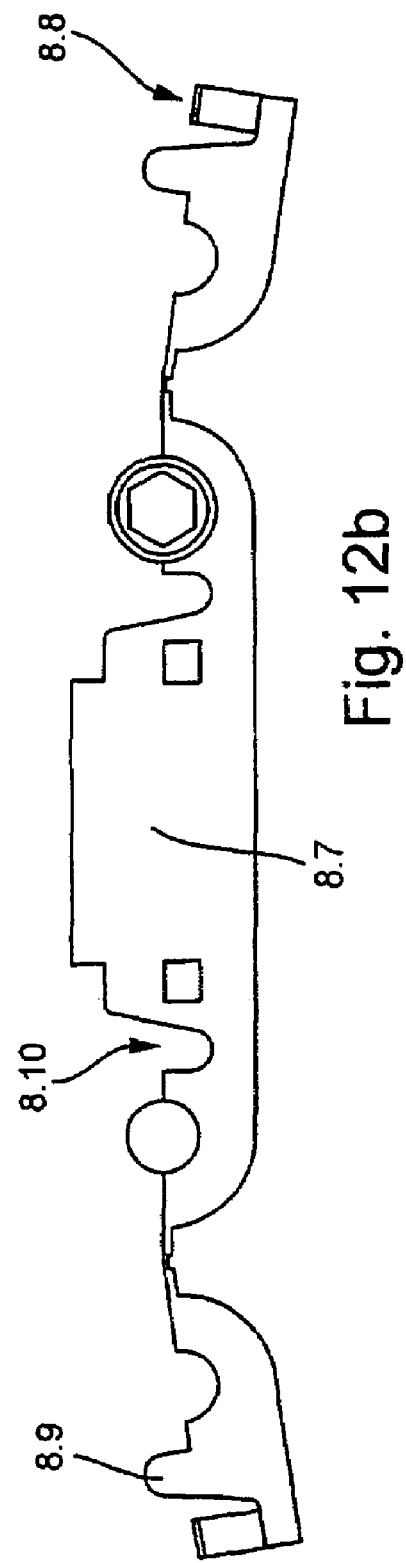

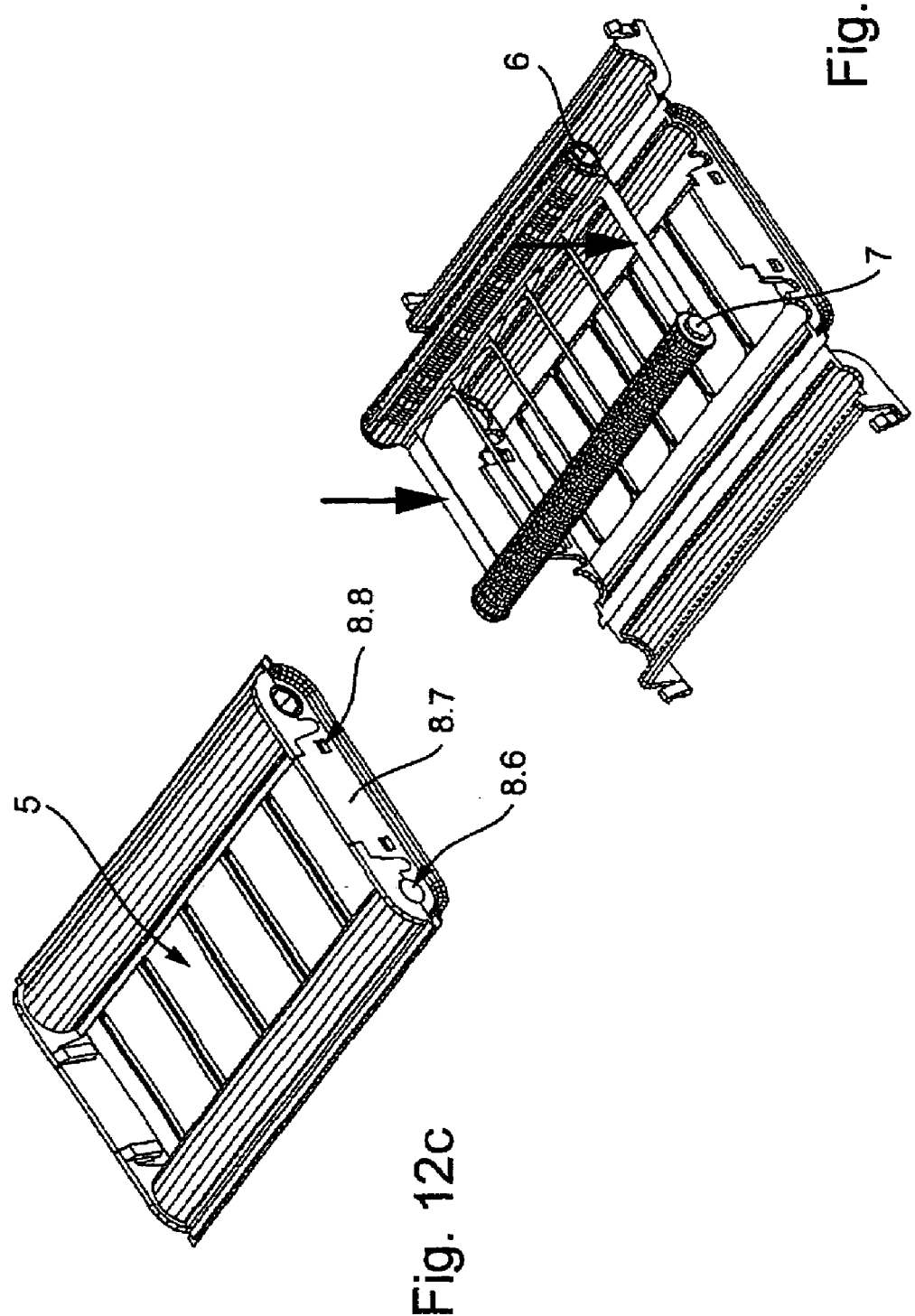

5

CONTROL DEVICE COMPRISING A ROLLER BAND CASSETTE

BACKGROUND

The invention relates to a control device, in particular for a heating and/or air conditioning system, for controlling air flows in motor vehicles.

DE 44 42 000 A1 relates to a control device of this type for a heating and/or air conditioning system which is designed as a louver cassette and is inserted into air ducts of a heating and/or air conditioning system for a motor vehicle. The control device regulates the amount and also the direction of the air flow passing through it. The control device is formed by a frame in which a multiplicity of pivotable slats which form a flap-type louver is arranged. Pivoting of the slats in a range of from 0 to 90° enables the passage cross section for the air flow to be completely closed, completely opened or partially opened up, the direction of the air flow also being influenced by the position of the slats. This louver cassette has a multiplicity of parts, caused by the slat design and the activating means associated therewith. In the case of narrow air gaps, whistling noises and possibly also rattling noises may occur. In addition, a louver cassette of this type has a relatively high air resistance, i.e. decrease of pressure.

DE 35 14 385 A1 has already disclosed replacing conventional flaps for controlling the air flows in a heating and/or air conditioning system by a "roller-type louver". The latter comprises a roller band which is partially provided with cutouts and closes or partially or completely opens up the passage openings of air flow ducts. The roller band is wound up and unwound in a manner guided via individual rollers, and is brought by means of a servomotor via a drive roller into a closing, opening or intermediate position.

SUMMARY

EP 0 705 725 A1 has disclosed a development of a roller-type louver of this type. In this, a film-like roller band which has, distributed over its length, a multiplicity of different cutouts for the passage of an air flow is guided past the outlet openings of the air conditioning system housing and therefore controls the outlet cross section for the air. In a further application, a roller band of this type is arranged directly in front of the heating element and controls the amount of air passing through the heating element and the bypass flow flowing around the heating element. This type of roller-type louver is adapted in each case to the specific installation conditions and configurations of a specific heating and/or air conditioning system.

It is the object of the present invention to improve a control device, in particular for a heating and/or an air conditioning system, to the effect that the control device has a minimal construction space, can be used universally and can be installed in a simple manner into the heating and/or air conditioning system, with it being possible for the control device to be assembled in a simple manner.

The main concept of the invention involves designing the frame of a control device for controlling air flows in motor vehicles in such a manner that the roller-type louver can be inserted into the frame and removed therefrom in a simple manner. This is achieved by two hollow bodies which are open along the longitudinal side and accommodate the drive shaft or the return shaft for the roller-type louver, the hollow bodies each having a pivotable cover for opening the particular hollow body. The roller band of the roller-type louver is preferably designed in such a manner that it accommodates both shafts in the manner of an endless band. In this case, there can be a fixed connection between the roller band and shaft, in particular on the drive shaft, for example by the roller band being attached fixedly to the shaft in some regions, in particular being clamped in a manner such that it runs in the longitudinal direction of the shaft.

In one advantageous embodiment, the pivotable cover is connected to the hollow body by means of a hinge, the hinge being designed, for example, as a film hinge.

In one particularly advantageous embodiment of the invention, at least parts of the hollow body are integrally formed on the housing, the at least one passage opening being arranged between the two hollow bodies.

In a further embodiment, the roller-type louver is connected fixedly to the drive shaft, the drive shaft comprising, for example, at least two parts between which the roller-type louver is clamped, the two parts being connected to each other by means of clipping or locking.

In one particularly advantageous embodiment of the invention, the roller-type louver is designed as an endless roller band with clearances for opening up the at least one passage opening.

In a preferred embodiment, the roller band is guided in two layers past the at least one passage opening, the clearances being distributed on the roller band in such a manner that, when a passage opening is closed, each layer of the roller band covers approximately half of the passage opening, the passage opening being opened by the two layers of the roller band moving in opposite directions and opening up the passage opening from the center outward. The two-layered structure advantageously avoids a fluttering of the band and, as a result, reduces the production of noise. The described manner of opening up the passage opening means that only half of the actuating path is required for opening or closing the passage opening.

For better guidance and actuation of the roller band, the at least one passage opening is divided by lattice bars into a plurality of apertures.

The drive shaft is driven by means of a servomotor, which is, for example, flanged directly onto the frame, or via a Bowden cable or a flexible shaft.

In another embodiment, the servomotor is integrated into the drive shaft, which is designed as a hollow shaft.

In a particularly advantageous embodiment of the invention, one frame is used to change two air flows, the frame comprising for this purpose two passage openings, the passage cross sections of which are changed, in which, in a first starting position, a first passage opening is completely opened and a second passage opening is completely closed, in which, in a second starting position, the first passage opening is completely closed and the second passage opening is completely opened, and in which any desired passage cross sections for the particular passage opening can be set between the first and the second starting position. In this case, the passage openings may also be arranged at predeterminable angles, for example of up to 90°, with respect to one another, as a function of the installation situation.

In one embodiment having two passage openings of the same size, the sum of the passage cross sections of the two passage openings always produces the maximum possible passage cross section of a passage opening.

For better guidance of the roller band in the case of a plurality of passage openings, the frame includes at least one supporting device between two passage openings, the supporting device being connected, preferably releasably, for example to the two side parts and, as a result, preventing a leakage from one passage opening to the other passage opening.

A particularly simple installation on the basis of a small number of individual parts and a simple insertion of the drive shaft and/or return shaft arises if the hollow body is designed in such a manner that at least one bearing point is provided in side walls of the hollow body, in which the drive shaft or the return shaft is mounted, in particular a respective half bearing being formed in side walls, both in the lower part and in the upper part, in each hollow body. However, it is also possible to form the bearing point completely in the upper part or in the lower part.

The previously described control device is preferably used in heating or air conditioning systems for motor vehicles.

BRIEF DESCRIPTION OF THE DRAWINGS

Exemplary embodiments of the invention are illustrated in the drawings and are described in more detail below.

In the drawings:

FIG. 3 shows a sectional illustration of the control device according to FIG. 1b;

FIG. 4 shows a sectional illustration of the control device according to FIG. 2b;

FIGS. 12a-d show an alternative embodiment of the control device;

DETAILED DESCRIPTION

Figure 1A:
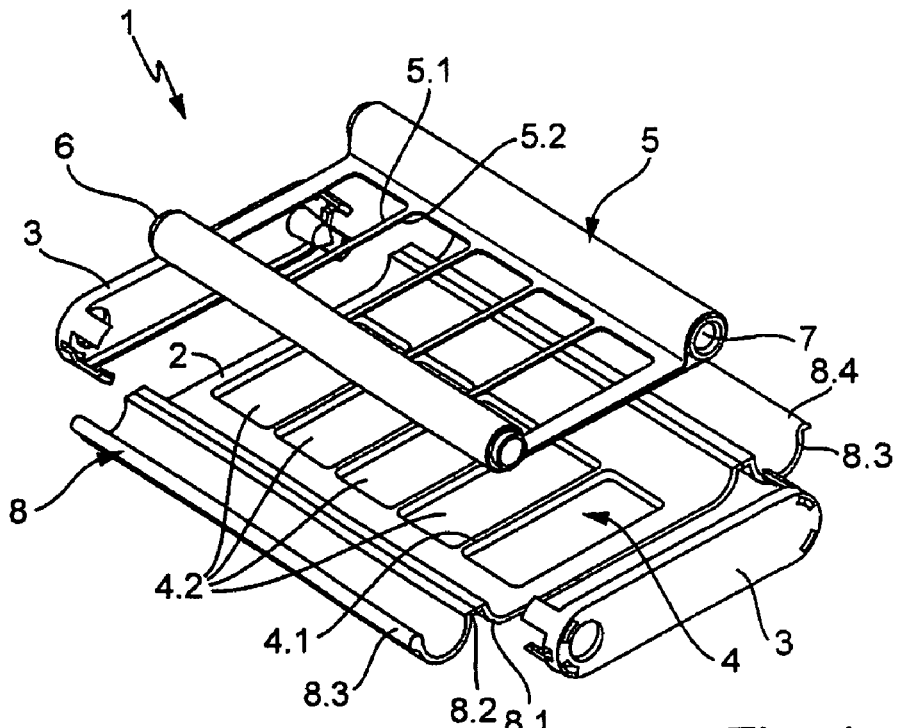
FIGS. 1a-d show a control device having a roller-type louver for changing one passage cross section.

FIG. 1 shows a control device 1, having a frame which comprises a housing 2 and two side parts 3. The housing encloses a passage opening 4 which is divided by lattice bars 4.1 into a plurality of apertures 4.2. These lattice bars 4.1, which are arranged in parallel, serve to strengthen the housing 2 and also to orient the air flow passing through it. In the exemplary embodiment illustrated, on the longitudinal sides, a respective lower part 8.1 of a hollow body 8, which is open along one longitudinal side, is integrally formed on the housing 2, the hollow body in the exemplary embodiment illustrated being designed as a hollow cylinder, and the two hollow bodies 8 either accommodating a drive shaft 6 or a return shaft 7. An upper part 8.3 is connected pivotably to the lower part 8.1 via a movable element 8.2. When the hollow body is opened, the roller-band subassembly, comprising a roller band 5, the drive shaft 6 and the return shaft 7, can be inserted in a simple manner from above into the housing 2. The upper part 8.3 is then pivoted onto the lower part and the housing 2 is closed on its transverse sides by the side parts 3.

The control means for changing the passage cross section of the passage opening comprise the endless roller band 5, the drive shaft 6 and the return shaft 7. The drive shaft 6 and the return shaft 7 are mounted rotatably in corresponding bearing points of the side parts 8 by means of end-side pins or hollow pins (not illustrated specifically). The roller band 5 is guided over the circumference of the drive shaft 6 and the return shaft 7. The roller band 5 has cutouts 5.1 which correspond in their cross sections to that of the apertures 4.2 in the housing 2. The cutouts 5.1 are divided by individual, narrow strips 5.2, so that in the roller band 5 the required tensile stress is maintained over the entire width and an airtight contact of the roller band 5 against the two shafts 6 and 7 is ensured.

FIGS. 1a to 1d show the individual parts of the control device 1 and the sequence during the assembly of the control device 1. FIG. 1a shows the housing 2 with the upper part 8.3 of the hollow body 8 pivoted open.

Figure 1B:
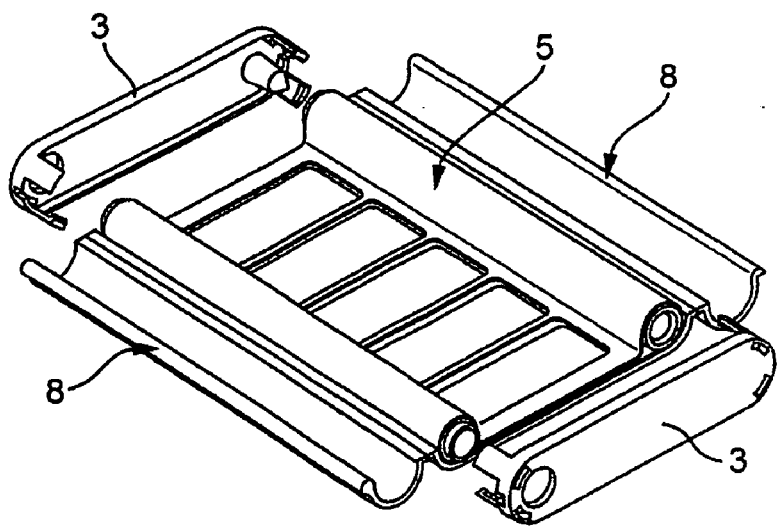

FIG. 1b shows the housing with the roller-band subassembly inserted in it, the drive shaft and the return shaft being inserted into the two lower parts 8.1 of the hollow bodies.

Figure 1C:
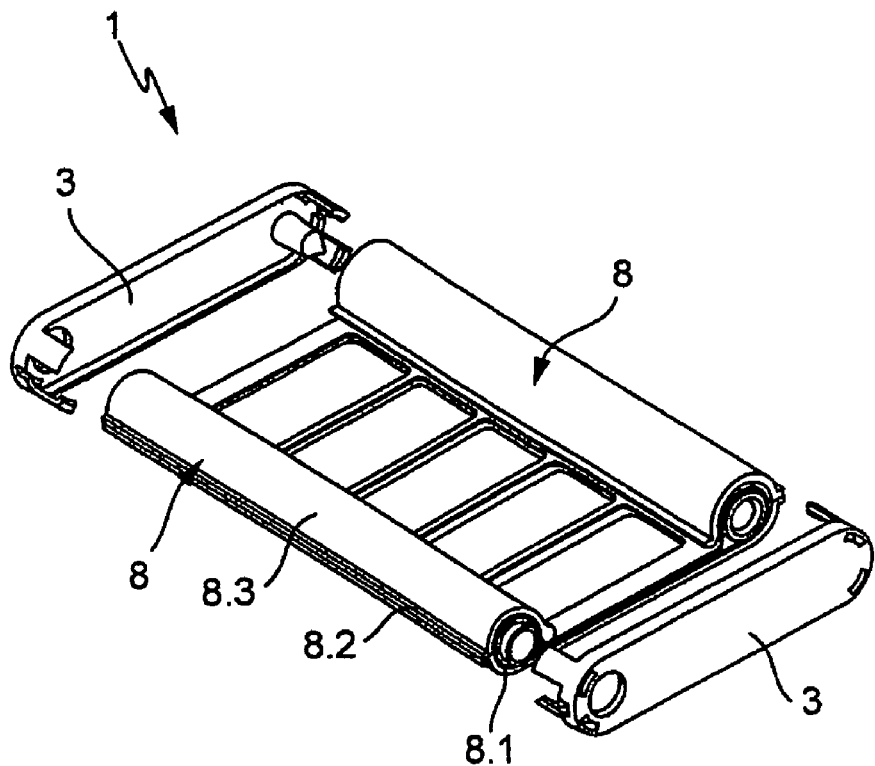

FIG. 1c shows the housing with the hollow body closed, i.e. the upper part 8.3 has been pivoted onto the lower part via the moveable element, which is designed in the exemplary embodiment illustrated as a film hinge, as a result of which the hollow body 8 is closed apart from a longitudinal slot 8.5 through which the roller band 5 is guided.

Figure 1D:
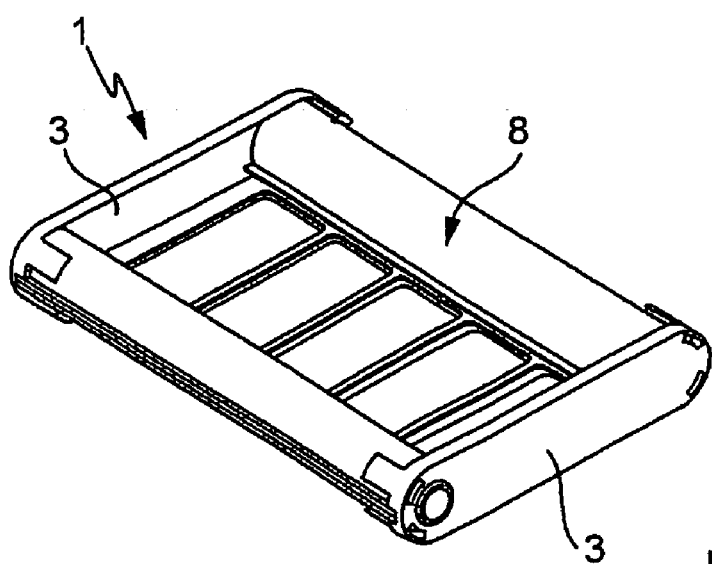

FIG. 1d shows the control device with the housing 2 closed by the side parts 3.

The control device described is inserted into a heating and/or air conditioning system (not illustrated here) for a motor vehicle, the control device being adapted with regard to its external dimensions to the particular air flow duct, so that the entire air flow cross section can be controlled by the cassette. In the exemplary embodiment illustrated, the passage cross section of a passage opening 4 can be controlled by five apertures 4.2.

FIG. 2 shows a control device 1 having a frame which comprises a housing 2 and two side parts 3. In contrast to the exemplary embodiment in FIG. 1, the housing here encloses two passage openings 4 which are divided by lattice bars 4.1 into a plurality of apertures 4.2. As is apparent from FIG. 2, the control device, analogously to the control device according to FIG. 1, likewise comprises a housing 2 with hollow bodies 8 integrally formed on it for accommodating the drive shaft 6 and the return shaft 7, and two side parts 3 and a roller band 5. In addition, a supporting device 9 for the additional guidance of the roller band 5 is arranged between the two passage openings 4. In the exemplary embodiment illustrated, the passage cross section can be controlled by two passage openings 4. The illustration shows a first starting position in which the left passage opening is completely opened and the right passage opening is completely closed.

Figure 2A:
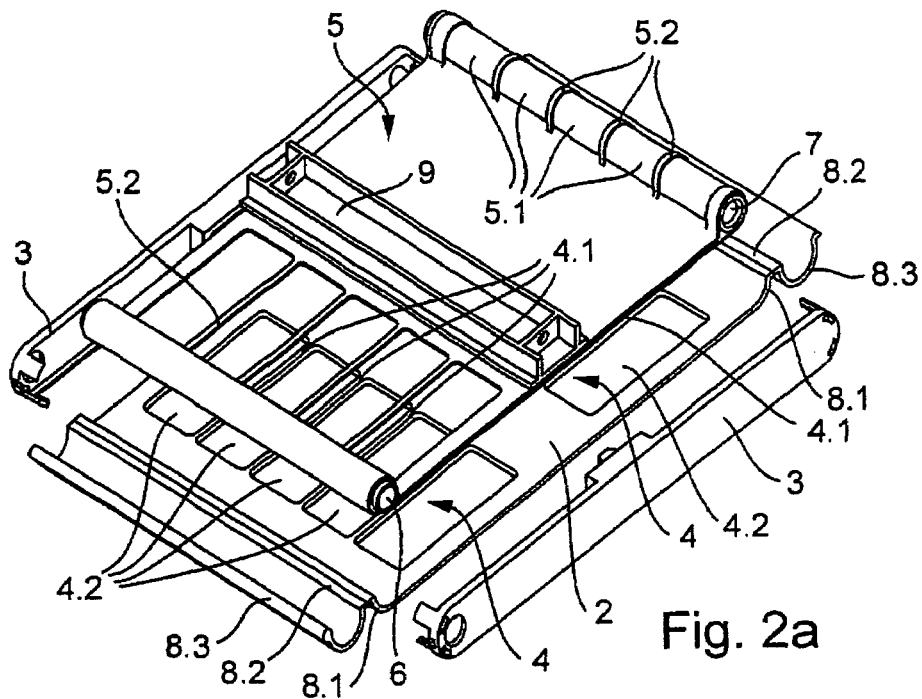
FIGS. 2a-d show a control device having a roller-type louver for changing two passage cross sections.

FIGS. 2a to 2d show the individual parts of the control device 1 for controlling two passage openings and the sequence during the assembly of the control device 1. FIG. 2a shows the housing 2 with the upper part 8.3 of the hollow body 8 pivoted open.

Figure 2B:
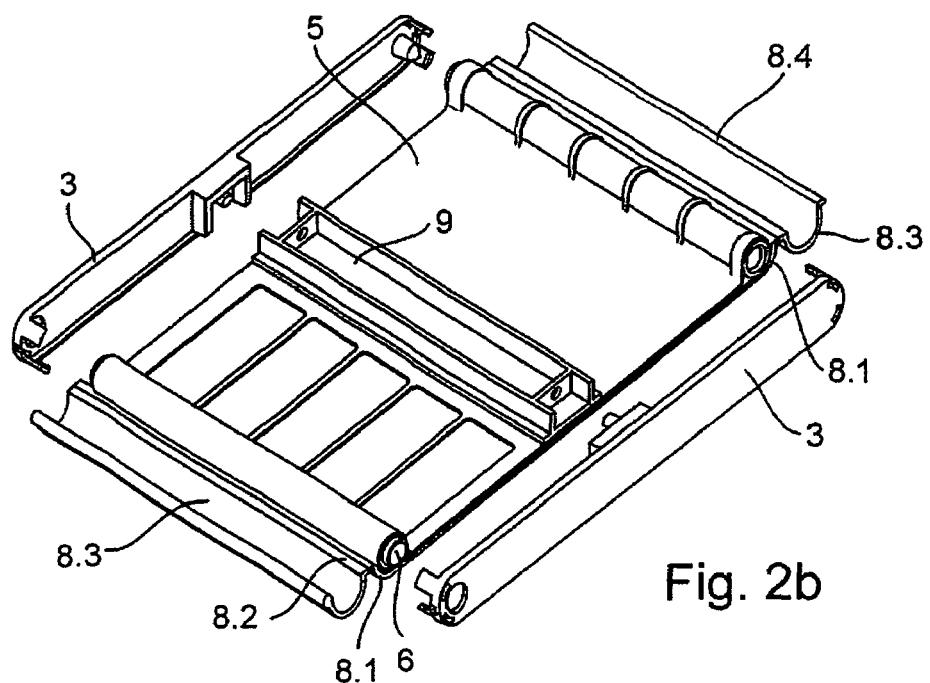

FIG. 2b shows the housing with the roller-band subassembly (roller band 5, drive shaft 6, return shaft 7) inserted and with a supporting device 9 placed between the passage openings 4, the drive shaft 6 and the return shaft 7 being inserted into the two lower parts 8.1 of the hollow bodies 8.

Figure 2C:
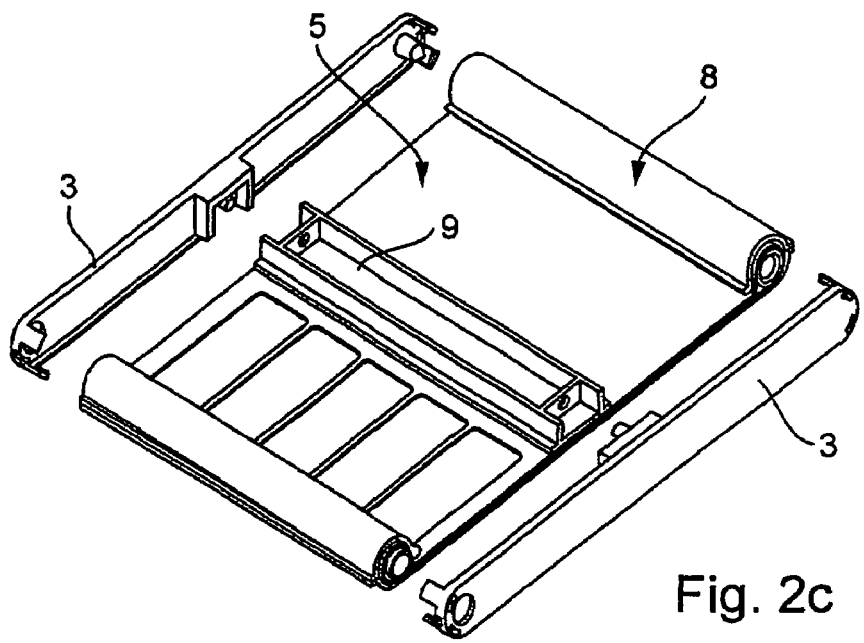

FIG. 2c shows the housing 2 with the hollow body 8 closed, i.e. the upper part 8.3 has been pivoted onto the lower part 8.1 via the moveable element 8.2, which is designed in the exemplary embodiment illustrated as a film hinge, as a result of which the hollow body 8 is closed except for a longitudinal slot 8.5 through which the roller band 5 is guided.

Figure 2D:
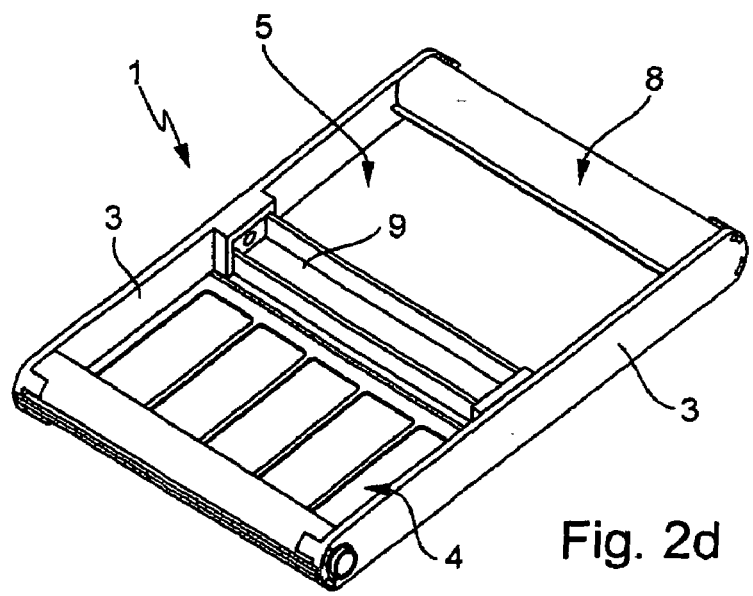

FIG. 2*d* shows the control device with the housing 2 closed by the side parts 3, the supporting device 9 likewise being connected, for example clipped, to the side parts.

FIG. 3 shows a sectional illustration of the control device 1 according to FIG. 1*b* without a roller band 5, in order to illustrate the pivoting movement 8.6 of the upper part 8.3 of the hollow body 8 about the pivot axis 8.7 which runs approximately centrally through the moveable element 8.2. As is apparent from FIG. 3, a lug 8.4 is integrally formed on the open end of the upper part 8.3, the lug facilitating the guidance of the roller band 5 when the hollow body 8 is closed.

FIG. 4 shows a sectional illustration of the control device 1 according to FIG. 2*b* with the roller-band subassembly (roller band 5, drive shaft 6, return shaft 7) inserted and the supporting device 9 placed on it.

Figure 5A:
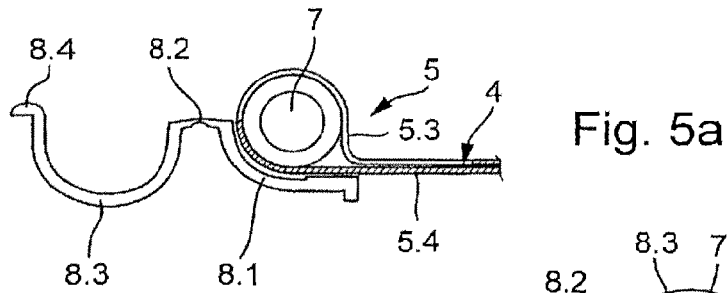
FIGS. 5a-b show a sectional illustration of the region of the return shaft according to FIGS. 1b and 2b.
Figure 5B:
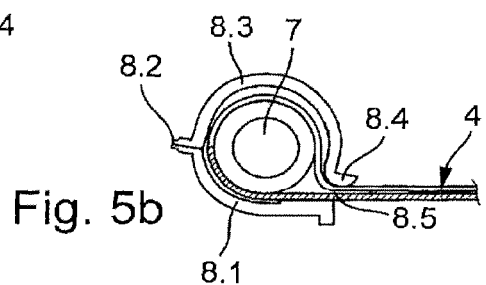

FIG. 5 shows a section through the region of the return shaft 7 according to FIGS. 1*b* and 2*b*. FIG. 5*a* shows the region with the roller-band subassembly inserted into the housing 2 and with the hollow body opened. FIG. 5*b* shows the region of the roller-band subassembly inserted into the housing 2 and with the hollow body 8 closed. As is apparent from FIG. 5, the roller band 5 is guided in two layers 5.3, 5.4 over the passage openings 4. The lug 8.4 which is integrally formed on the upper part 8.3 of the hollow body facilitates the guidance of the roller band 5 through the longitudinal opening 8.5 of the hollow body 8.

Figure 6A:
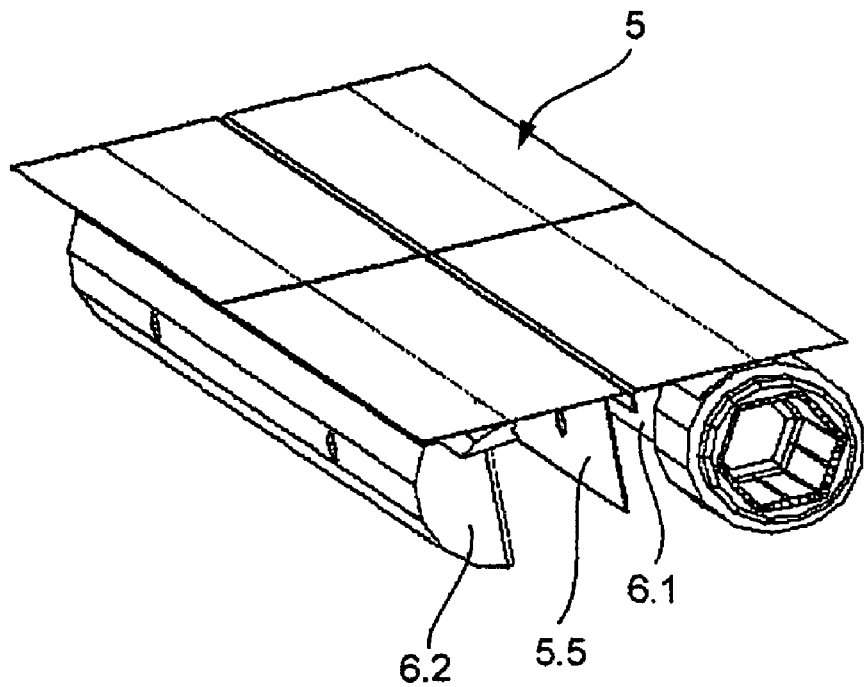
FIGS. 6a-b show a sectional illustration of the drive shaft with the roller band.
Figure 6B:
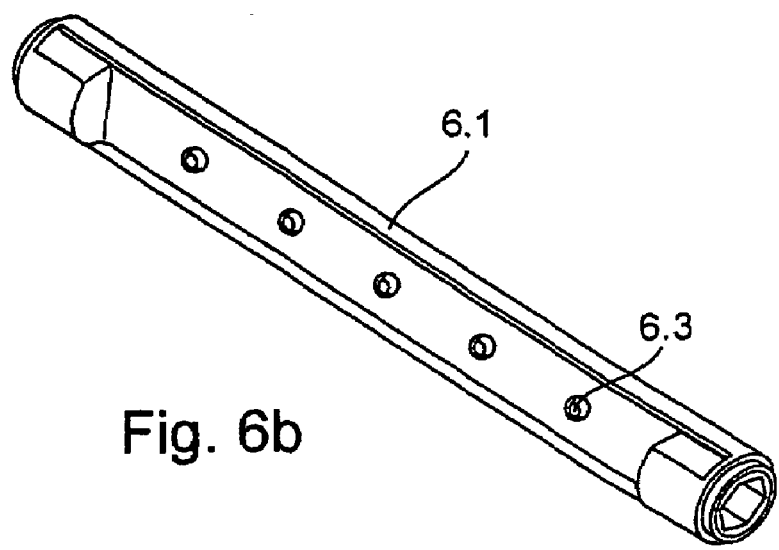

FIG. 6 shows a schematic illustration of the connection of the roller band 5 to the drive shaft 6. As is apparent from FIG. 6*a*, the drive shaft 6 comprises a lower part 6.1 and an upper part 6.2, it being possible for the upper part 6.2 to be connected to the lower part 6.1 by means of a clip connection 6.3. For the connection to the drive shaft 6, at its ends the roller band has, for example, holes 5.5 through which it is fixed on the lower part 6.1 of the drive shaft 6. When the upper part 6.2 is clipped to the lower part 6.1, the roller band is then clamped and, as a result, is connected fixedly to the drive shaft. For clarification, FIG. 6*b* shows an illustration of the lower part 6.1 of the drive shaft 6 with the corresponding clips 6.3 for the clip connection to the upper part 6.2.

Figure 7A:
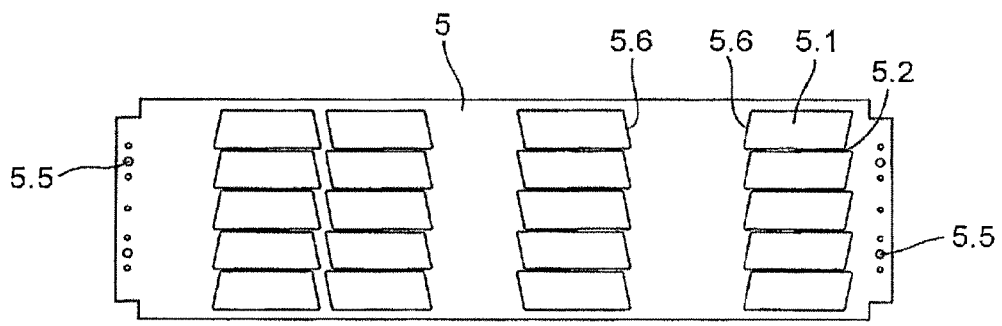
FIGS. 7a-c show various roller bands in a schematic illustration.
Figure 7B:
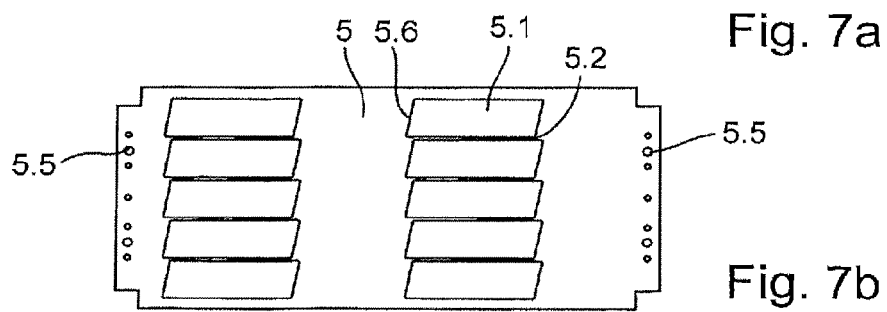
Figure 7C:
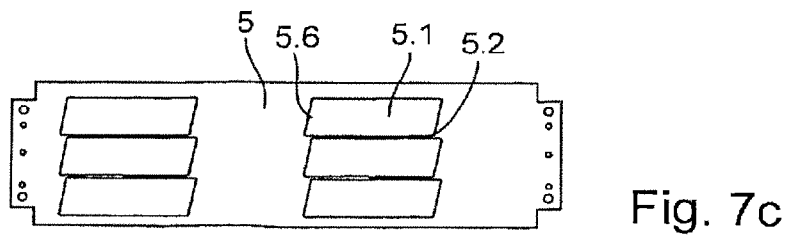

FIG. 7 shows various roller bands 5 in a schematic illustration. Thus, FIG. 7*a* shows a roller band 5 for controlling two passage openings. The roller band 5 has cutouts 5.1 which correspond with regard to their cross sections to that of the apertures 4.2 in the housing 2. The cutouts 5.1 are divided by individual, narrow strips 5.2. The edges 5.6 of the cutouts are preferably beveled in order to ensure that the two roller-band layers easily run over one another. At the two ends, the roller band 5 has holes 5.5 for the fastening to the drive shaft 6. FIGS. 7*b* and 7*c* show roller bands for controlling a passage opening having a different number of apertures 4.2.

Figure 8:
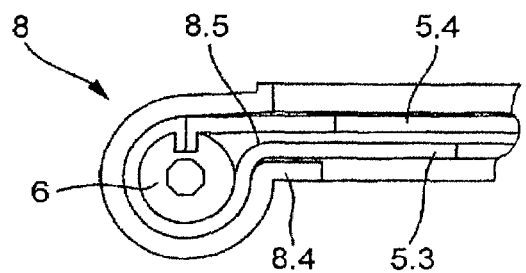
FIG. 8 shows an enlarged detail of the drive shaft with the roller band.

FIG. 8 shows an enlarged detail of the roller band 5 in the region of the drive shaft 6 corresponding to the illustration in FIGS. 1*d* and 2*d*, the same reference numbers being used to a very great extent. As is apparent from FIG. 8, the roller band 5 is connected at its two ends fixedly to the drive shaft 6. The design of the roller band 5 as an endless band causes the formation of an upper layer 5.4 and a lower layer 5.3 which move in relation to each other when the drive shaft 6 is rotated. A suitable arrangement of cutouts therefore makes it possible to open the passage openings from the center of the passage opening outward or to close them from the outside to the center. The drive shaft 6 is situated in the hollow body 8 of the housing 2, the hollow body 8 having a slot 8.5 in the direction of the center of the housing. The upper part 8.3 of the hollow body 8 merges into a resiliently designed lug or tongue 8.4 having a radius R, above which the roller band 5 is introduced into the hollow body 8 and is led out of it again. The endless roller band 5 has an upper layer 5.4 and a lower layer 5.3 which move in an opposed manner with respect to each other. The roller band 5 loops around approx. ¾ of the circumference of the drive shaft 6 and is tensioned by the resilient tongue 8.4. The tongue 8.4 therefore replaces a tensioning roller.

As further possibilities for the connection of the roller band 5 to the drive shaft 6, the roller band 5 may also be fastened at its two ends to the drive shaft 6 by the roller-band ends being welded to the drive shaft 6 in the longitudinal direction thereof. In the case of the described fastenings to the drive shaft, the adjustment path for the roller band is dependent on the circumference of the drive shaft or on the angle of wrap.

Figure 13A:
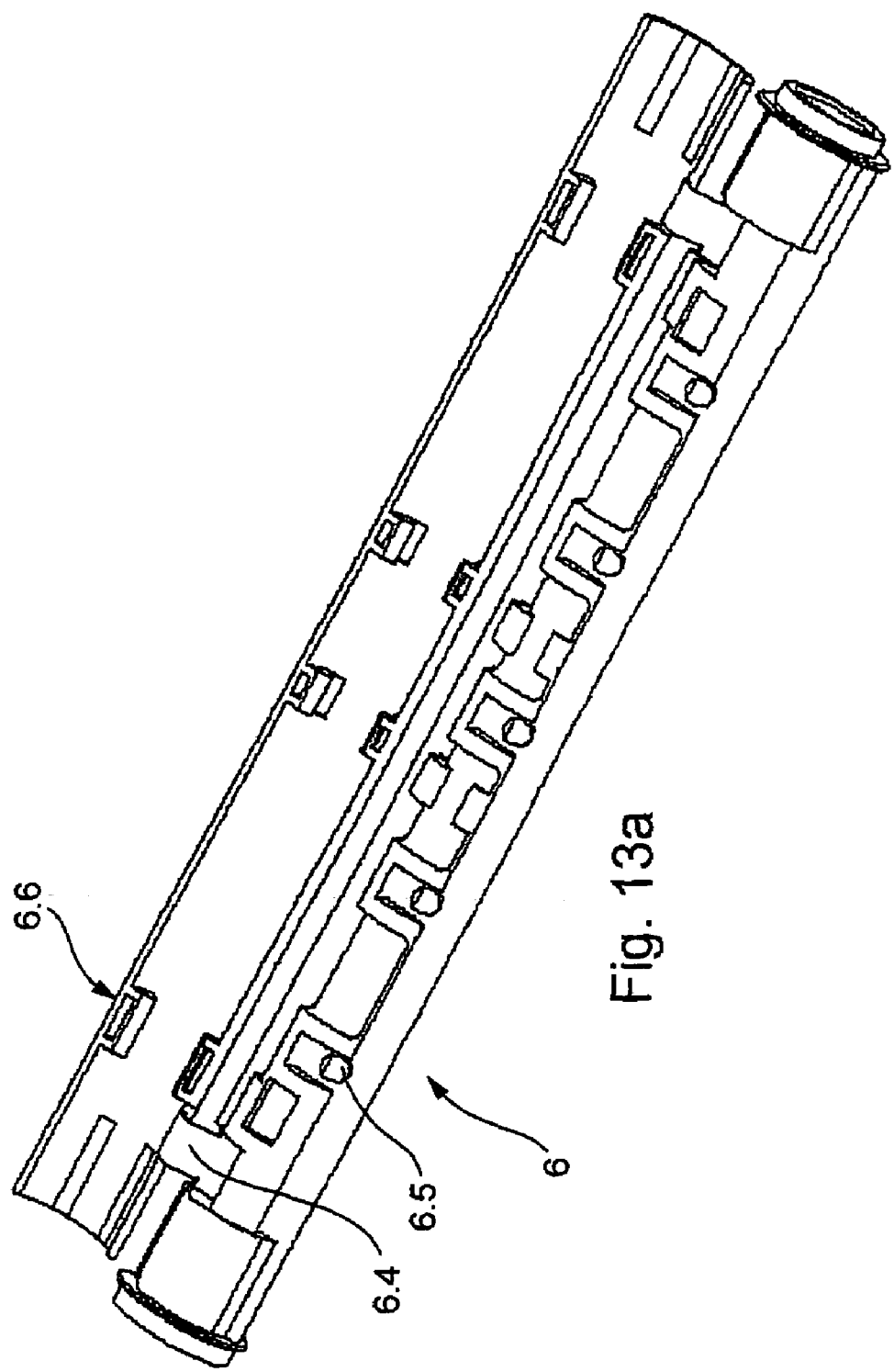
FIGS. 13a-c show a further embodiment.
Figure 13B:
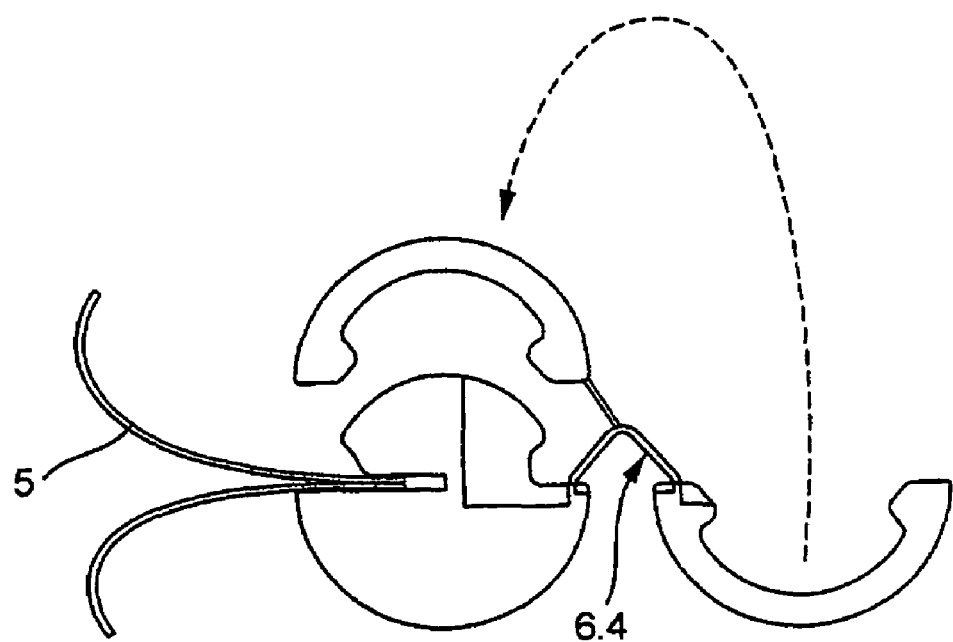
Figure 13C:
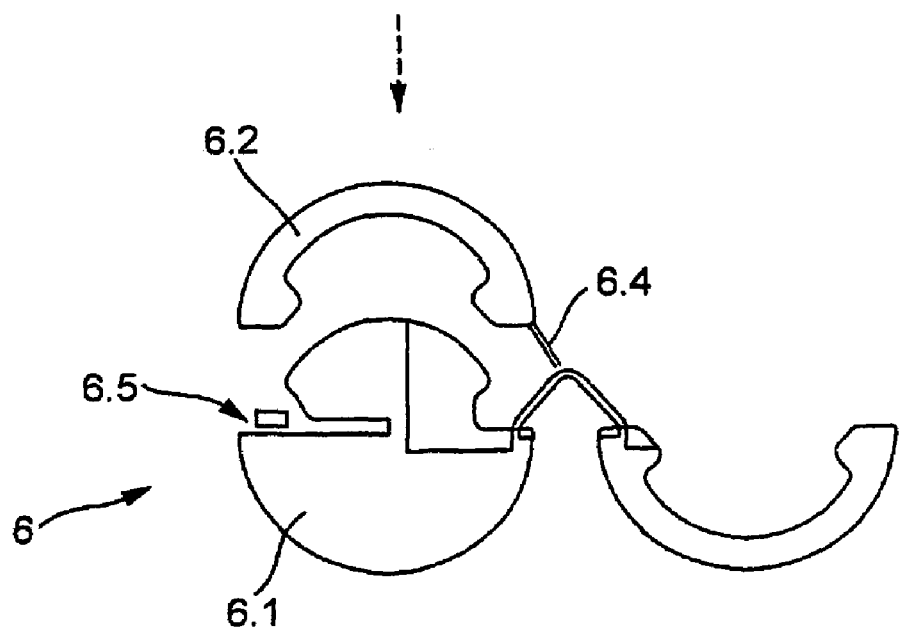

A further possibility for connecting the roller band 5 to the drive shaft 6 is explained in more detail with respect to FIGS. 13*a* to 13*c*. In this case, the drive shaft 6 is of two-part design with a lower part 6.1 and an upper part 6.2, the two parts 6.1 and 6.2 being connected integrally to each other via two connecting webs 6.4, which basically have a type of hinge function. The connecting webs 6.4 have an essentially rectangular cross section of 0.5 mm×2 mm and are formed by spray ducts, with a buckling point being provided approximately centrally. In this case, the connecting webs 6.4 are designed in such a manner that they are arranged in the interior of the drive shaft 6 when the two parts 6.1 and 6.2 are folded together.

The roller band 5 is in principle positioned in the above-mentioned manner by means of fixing pins 6.5 and is clamped between the two parts 6.1 and 6.2 by means of snap hooks 6.6 (clip connection). The connection of the two parts 6.1 and 6.2 takes place, as is apparent from FIG. 13*b* and FIG. 13*c* (see the corresponding arrows in the figures) by means of a combined pivoting/longitudinal movement, with essentially a longitudinal movement taking place for the clipping (cf. FIG. 13*c*). With regard to the design of the roller band 5, reference is made to FIGS. 7*a* to 7*c*, in particular with regard to the holes 5.5 on the two edges thereof.

Figure 14A:
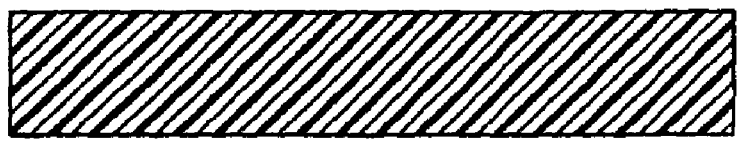
FIGS. 14a-c show sections through various roller bands.
Figure 14B:
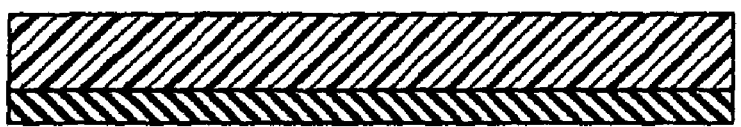
Figure 14C:
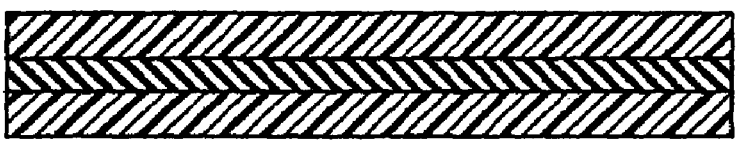

The roller band 5 may be a single-layer film (monofilm), as illustrated in FIG. 14*a*. A film of aluminum or a multilayered film having a layer of aluminum, as illustrated in FIGS. 14*b* and 14*c*, is particularly suitable in particular with regard to a low heat conductivity. The layer of aluminum may be, for example, vapor-deposited or bonded on, if appropriate also only in one region of the roller band. The roller band 5 consists, in particular, of readily glidable, abrasion-resistant material which is thermally stable in a region of from −40° C. to 100° C. Furthermore, the roller band should be low in noise and water-repellent. The layer thicknesses may differ here.

Figure 9A:
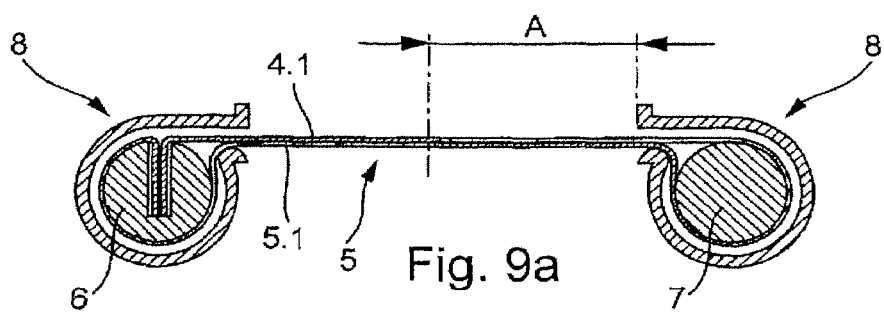
FIGS. 9a-c show a sectional illustration of the control device according to FIG. 1.
Figure 9B:
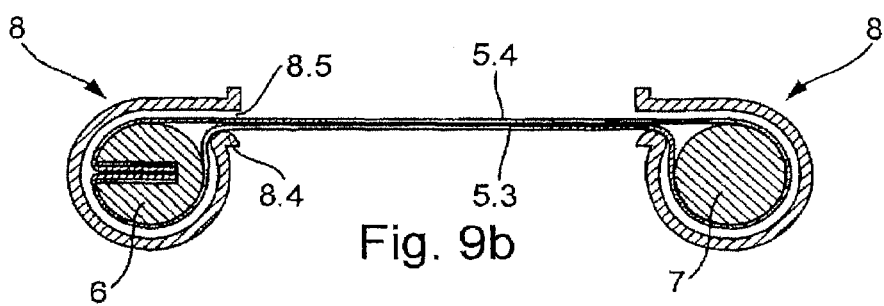
Figure 9C:
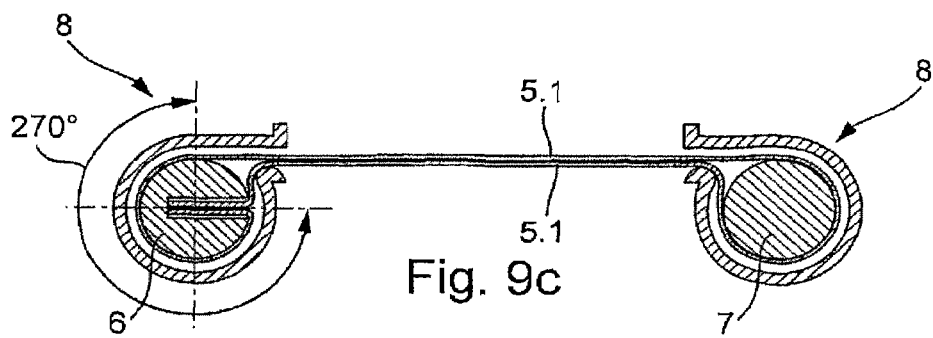

FIGS. 9*a* to 9*c* show a sectional illustration of the control device according to FIG. 1 during the transition from a first starting position (passage opening closed) into a second starting position (passage opening opened) via an intermediate position (passage opening partially opened). As is apparent from FIG. 9, because of the use of the two layers 5.3, 5.4 of the roller band 5, the roller band 5 requires a shorter adjustment path in order to bring the passage opening from the closed starting position into the opened starting position, since each layer has to be moved only by an adjustment path which corresponds approximately to half of the width A of the passage opening 4. For this purpose, the drive shaft has to be rotated further through an angle of approximately 270°. It emerges from this that, in the case of the exemplary embodiment illustrated, ¾ of the circumference of the drive shaft or of the return shaft corresponds approximately to half of the width A of the passage opening.

Figure 10A:
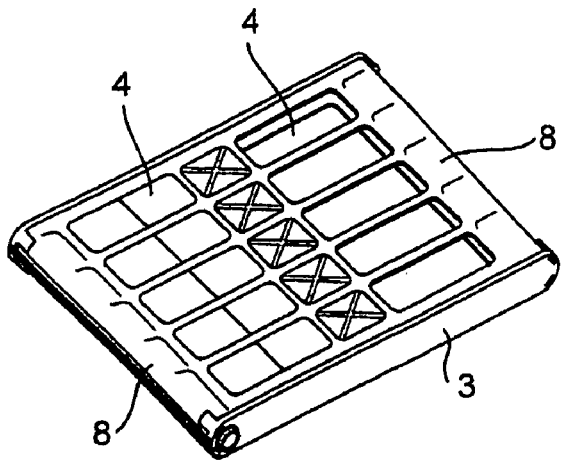
FIGS. 10a-c show a control device according to FIG. 2.
Figure 10B:
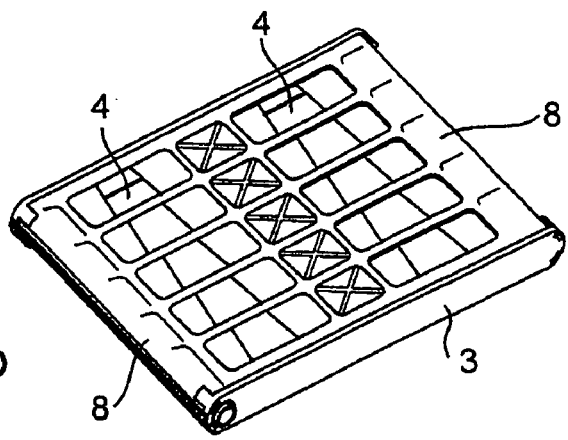
Figure 10C:
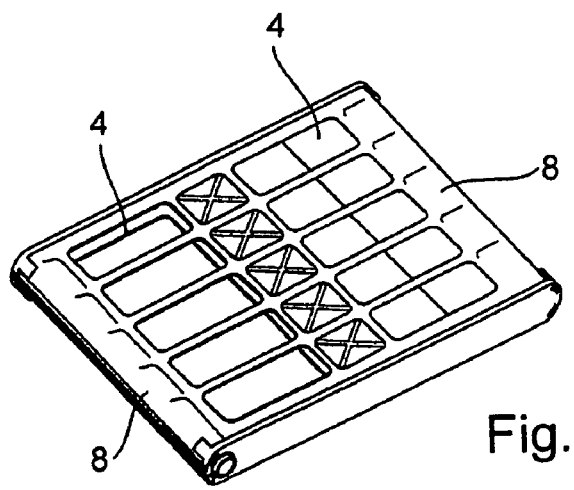

FIGS. 10a to 10c show the control device according to FIG. 2 during the transition from a first starting position (left passage opening opened, right passage opening closed) into a second starting position (left passage opening closed, right passage opening opened) via an intermediate position (both passage openings partially opened). As is apparent from FIG. 10, opened apertures are closed from the outside to the center and closed apertures are opened from the center to the outside.

Figure 11:
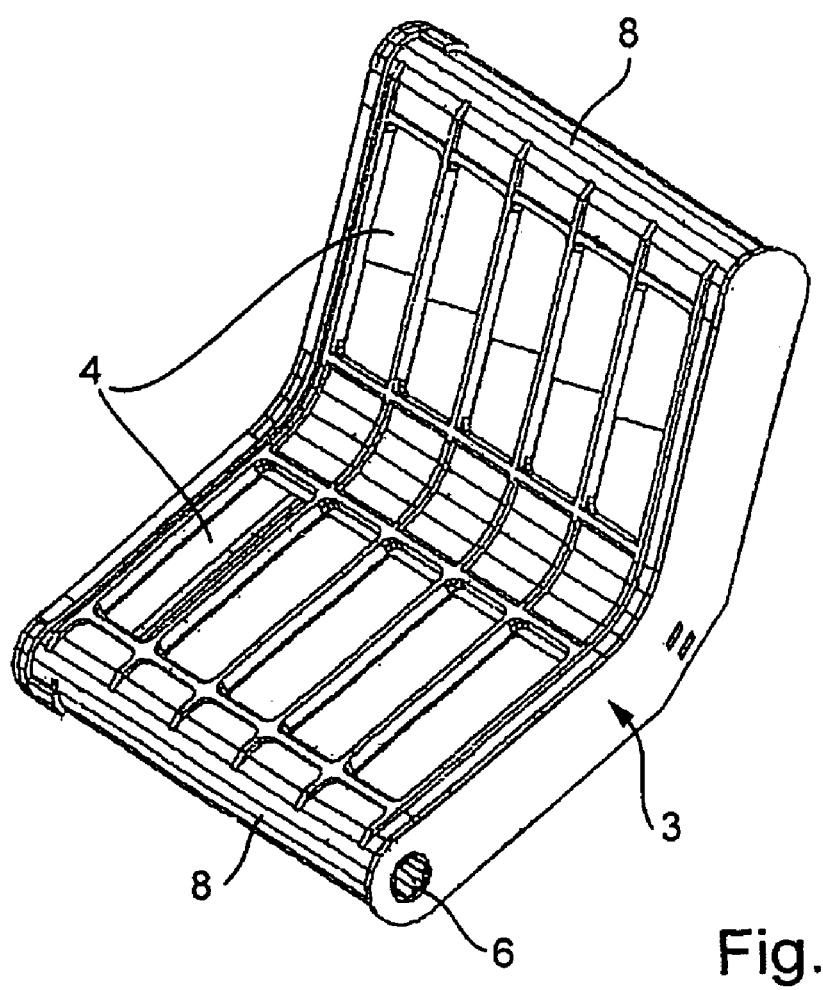
FIG. 11 shows an alternative embodiment of the control device for controlling two air flows.

FIG. 11 shows an embodiment of the control device for controlling two air flows which run at a predetermined angle with respect to one another. For this purpose, the two passage openings are arranged at the predetermined angle with respect to each other. The angle is achieved by a corresponding design of the region between the two passage openings.

FIGS. 12a to 12d show an embodiment, in which bearing points 8.6 which are integrated into the hollow bodies 8 are provided for the drive shaft 6 and return shaft 7. In this case, regions which are cut out or recessed in the form of a semicircle are provided in the lower part 8.1 and upper part 8.3 on side walls 8.7 and form the bearing points 8.6. In this case, the side walls 8.7 can be of widened design in this region, so that the material is subjected to a lower loading. A side part 3 which is placed on, as illustrated, for example, in FIG. 1a, can be omitted, since the two side walls 8.7, which are formed on the housing 2 with lower parts and upper parts 8.1 and 8.3, take on the function thereof.

The two shafts are inserted together with the roller band 5 into the lower bearing points 8.6 in the direction of the two arrows of FIG. 12d. The upper parts 8.3 are then pivoted shut, so that the upper bearings 8.6 come into contact with the shafts. The locking of lower and upper part takes place by means of a clip connection 8.8 which is provided on the side walls 8.7, as can be gathered in particular from FIG. 12d. For the positioning and improved transmission of force in the radial direction of the side walls 8.7 with respect to the bearing points 8.6, a lug 8.9 is provided on the side walls 8.7 of the upper part 8.3 and, during the closing process, passes into a corresponding receptacle 8.10 which is formed on the side walls 8.7 of the lower part 8.1.

The invention claimed is:

1. A control device for controlling air flows in a motor vehicle, comprising:
   a frame having at least one passage opening; and
   a roller-type louver for changing a passage cross section for air flowing through the passage opening,
   wherein the frame comprises a housing with at least two hollow bodies which are open along longitudinal sides, each hollow body accommodating a drive shaft or a return shaft for the roller-type louver,
   wherein each hollow body comprises a longitudinal portion running along a longitudinal axis of the drive shaft or return shaft, a pivotable cover for opening its respective hollow body, and a movable element connecting its respective pivotable cover to its respective longitudinal portion at a first edge of the pivotable cover, and
   wherein the longitudinal portion of each hollow body is integrally formed on the housing and the pivotable cover runs along the longitudinal axis of the drive shaft or return shaft,
   wherein the pivotable cover further comprises a second edge opposed to the first edge, the second edge of the pivotable cover comprising a projection that guides and applies tension to the roller-type louver when the pivotable cover is in a closed position.

2. The control device as claimed in claim 1, wherein the moveable element is designed as a film hinge.

3. The control device as claimed in claim 1, wherein the at least one passage opening is arranged between the two hollow bodies.

4. The control device as claimed in claim 1, wherein the roller-type louver is connected fixedly to the drive shaft.

5. The control device as claimed in claim 4, wherein the drive shaft comprises at least two parts, and wherein the roller-type louver is clamped or welded between the two parts of the drive shaft.

6. The control device as claimed in claim 5, wherein the two parts of the drive shaft are connected to each other by clipping or locking.

7. The control device as claimed in claim 1, wherein the housing is closed laterally by a respective side part.

8. The control device as claimed in claim 1, wherein the roller-type louver is designed as an endless roller band having openings or cutouts for opening at the passage cross section.

9. The control device as claimed in claim 8, wherein the roller band is guided in two layers past the at least one passage opening, wherein the openings or cutouts are distributed on the roller band such that, when the at least one passage opening is closed, each layer of the roller band covers approximately half of the passage opening, and wherein the passage opening is opened by the two layers of the roller band moving in opposite directions and opening up the passage opening from center outward.

10. The control device as claimed in claim 8, wherein edges of openings or cutouts of the roller band are beveled.

11. The control device as claimed in claim 1, wherein the at least one passage opening is divided by lattice bars into a plurality of apertures.

12. The control device as claimed in claim 1, wherein the passage cross section can be enlarged from a center of an associated passage opening outward on both sides and can be reduced in size from an outside to the center on both sides.

13. The control device as claimed in claim 1, wherein the drive shaft is driven via Bowden cable or a flexible shaft.

14. The control device as claimed in claim 1, wherein a servomotor for adjusting the drive shaft is flanged onto the frame.

15. The control device as claimed in claim 14, wherein the servomotor is arranged coaxially with the drive shaft.

16. The control device as claimed in claim 14, wherein the servomotor is integrated into the drive shaft, which is designed as a hollow shaft.

17. The control device as claimed in claim 14, wherein the frame comprises two passage openings, and wherein an air flow is changed in each case by a change in the passage cross section of the respective passage opening.

18. The control device as claimed in claim 17, wherein, in a first starting position, a first passage opening is completely opened and a second passage opening is completely closed.

19. The control device as claimed in claim 18, wherein, in a second starting position, the first passage opening is completely closed and the second passage opening is completely opened.

20. The control device as claimed in claim 19, wherein any desired passage cross section for the respective passage opening can be set between the first position and the second starting position.

21. The control device as claimed in claim 17, wherein, when the passage openings are the same size, a sum of the passage cross sections of the two passage openings always produces a maximum possible passage cross section of a particular passage opening.

22. The control device as claimed in claim 1, wherein the frame includes at least one supporting device between two passage openings.

23. The control device as claimed in claim 22, wherein the at least one supporting device is releasably connected to two side parts.

24. The control device as claimed in claim 1, wherein at least one bearing point is provided in a side wall of each hollow body in which the drive shaft or the return shaft is mounted.

25. The control device as claimed in claim 24, wherein the at least one bearing point is of a two-part design and in each case one part of the bearing point is arranged in an upper part of the side wall of its respective hollow body and another part of the bearing point is arranged in a lower part of the side wall of its respective hollow body.

26. The control device as claimed in claim 24, wherein the at least one bearing point is of single-part design and is arranged completely in the side wall of its respective hollow body.

27. The control device as claimed in claim 1, wherein the roller-type louver is a controlling means.

28. The control device as claimed in claim 1, wherein the roller-type louver is in contact with at least one of the drive shaft and the return shaft for less than a full circumference of the at least one drive shaft and return shaft.

29. A heating or air conditioning system comprising:
a control device, wherein the control device comprises:
a frame having at least one passage opening; and
a roller-type louver for changing a passage cross section for air flowing through the passage opening,
wherein the frame comprises a housing with at least two hollow bodies which are open along longitudinal sides, each hollow body accommodating a drive shaft or a return shaft for the roller-type louver,
wherein each hollow body comprises a longitudinal portion running along a longitudinal axis of the drive shaft or return shaft, a pivotable cover for opening its respective hollow body, and a movable element connecting its respective pivotable cover to its respective longitudinal portion at a first edge of the pivotable cover, and
wherein the longitudinal portion of each hollow body is integrally formed on the housing and the pivotable cover runs along the longitudinal axis of the drive shaft or return shaft,
wherein the pivotable cover further comprises a second edge opposed to the first edge, the second edge of the pivotable cover comprising a projection that guides and applies tension to the roller-type louver when the pivotable cover is in a closed position.

30. The heating or air conditioning system as claimed in claim 29, wherein the roller-type louver is in contact with at least one of the drive shaft and the return shaft for less than a full circumference of the at least one drive shaft and return shaft.

31. A control device for controlling air flows in a motor vehicle, comprising:
a frame having at least one passage opening; and
a roller-type louver for changing a passage cross section for air flowing through the passage opening,
wherein the frame comprises a housing with at least two hollow bodies which are open along longitudinal sides, each hollow body accommodating a drive shaft or a return shaft for the roller-type louver, the hollow bodies each having a pivotable cover for opening the respective hollow body,
wherein the roller-type louver is designed as an endless roller band that is guided in two layers past the at least one passage opening,
wherein openings or cutouts are distributed on the roller band such that, when the at least one passage opening is closed, each layer of the roller band covers approximately half of the passage opening, and
wherein the passage opening is opened by the two layers of the roller band moving in opposite directions and opening up the passage opening from center outward.

* * * * *